United States Patent [19]
Wolf et al.

[11] Patent Number: 5,741,187
[45] Date of Patent: Apr. 21, 1998

[54] FLEXIBLE SHAFT-COUPLING

[75] Inventors: Franz Josef Wolf, Bad Soden-Salmunster; Kurt Fiedler, Zeppelinring 3, D-67433 Geinsheim, both of Germany

[73] Assignee: Kurt Fiedler, Geinsheim, Germany

[21] Appl. No.: 573,911

[22] Filed: Dec. 18, 1995

Related U.S. Application Data

[63] Continuation of Ser. No. 110,823, Aug. 24, 1993, abandoned.

[30] Foreign Application Priority Data

Aug. 27, 1992 [DE] Germany .................. 42 28 488.0

[51] Int. Cl.⁶ .................................................. F16D 3/50
[52] U.S. Cl. ..................... 464/55; 464/87; 464/185
[58] Field of Search ............................ 464/87, 93, 147, 464/906, 51, 55, 69, 112, 185, 905

[56] References Cited

U.S. PATENT DOCUMENTS

| | | | |
|---|---|---|---|
| 1,681,793 | 8/1928 | Steiner | 464/87 |
| 2,396,750 | 3/1946 | Ransom | 464/905 X |
| 2,969,659 | 1/1961 | Reuter | 464/87 |
| 3,157,129 | 11/1964 | Ober | 464/55 X |
| 3,731,499 | 5/1973 | Morlon | 464/93 |
| 4,182,139 | 1/1980 | Hornig et al. | 464/55 |
| 4,557,703 | 12/1985 | Rivin | 464/87 X |
| 5,160,299 | 11/1992 | Sweeney | 464/906 X |
| 5,222,913 | 6/1993 | Nagashima | 464/93 |
| 5,230,659 | 7/1993 | Bird et al. | 464/906 X |
| 5,290,203 | 3/1994 | Krude | 464/906 X |
| 5,338,259 | 8/1994 | Lobel | 464/93 |

FOREIGN PATENT DOCUMENTS

| | | | |
|---|---|---|---|
| 1200017 | 12/1985 | U.S.S.R. | 464/906 |
| 479638 | 2/1938 | United Kingdom | 464/87 |
| 2129524 | 5/1984 | United Kingdom | 464/112 |

*Primary Examiner*—Eileen A. Dunn
*Attorney, Agent, or Firm*—Lowe, Price, LeBlanc & Becker

[57] ABSTRACT

A flexible shaft coupling in which the torque transmission takes place by way of elastomer shackles between the two shafts to be coupled. The coupling components in the form of separate anchoring plates are all arranged in a single radial plane of the coupling, whereas the radially outward-pointing elastomer shackles are mounted to enclose the coupling. For predetermined torques to be transmitted, this design allows minimal outside dimensions of the flexible shaft coupling, as a result of which these couplings are especially applicable to wheel driveshafts of motor vehicles.

25 Claims, 4 Drawing Sheets

FLEXIBLE SHAFT-COUPLING

RELATED APPLICATIONS

This application is a continuation of Ser. No. 08/110,823 filed Aug. 24, 1993, now abandoned.

FIELD OF THE INVENTION

The present invention relates to a flexible shaft-coupling usable in a ganged (i.e., constant-velocity) joint.

Lastly the invention relates to using such a flexible shaft-coupling or a ganged joint.

BACKGROUND OF THE INVENTION

Flexible shaft-couplings of the type described herein are commonly used where two essentially aligned shafts having only a slight misalignment must be connected in a torsionally elastic manner. As a rule, a torsionally elastic link such as a spacer having elasticity like rubber, for instance, a flexible disk, a loop disk or a plurality of separate elastomer straps or loops is placed between the shafts to compensate for the misalignment.

The known elastomer couplings usually include first and second coupling parts, each of which has an annular flange. One of the flanges is integrally linked with or essentially rigidly affixed to one of the two shafts which must be connected. The two annular flanges are oriented to be mutually parallel in the assembled state and have on their facing surfaces a plurality of anchoring pins which are mutually parallel and also parallel to the coupling axis, that is to the longitudinal axis of the aligned shafts. The anchoring pins of the first flange alternate with those of the second pin in the circumferential direction and are circumferentially spaced from each other. All adjoining anchoring pins are connected by an elastomer strap enclosing both pins like a loop. When the first shaft is being driven, the anchoring pins of the flange of the first shaft elastically, that is allowing a defined spring-loaded torsional motion, transmit the drive torque by means of the elastomer straps to the anchoring pins of the second shaft is flange and hence to this shaft itself.

Such flexible shaft couplings are thoroughly satisfactory to filter out interfering oscillations of low or middle frequencies, especially in the acoustic range. Such flexible shaft-couplings are used in the automotive industry especially in the field of joint transmissions and the steering assemblies. However all these known shaft couplings incur the drawback foremost of having a comparatively large axial length on account the axially opposite coupling flanges and anchoring pins and further a comparatively large outside diameter, for a given torque to be transmitted, on account of the annular flanges radially-outward overlapping the zone of the anchoring pins and elastomer straps. In other words, the known flexible couplings cannot be used in practice when space is at a premium, as is the case for instance in the sites of the drive shafts for the front and rear wheels of motor vehicles. In practice this means specially that front-driven vehicles with front engines or rear-driven vehicles with rear engines cannot be insulated from oscillations or vibrations, especially in the acoustic range, due to low or high frequency oscillations transmitted from the wheels on account of road roughness; in such vehicles the related interfering oscillations are directly transmitted in metal-on-metal manner to the transmission and engine block, being only slightly damped merely by the engine bearing and thus transmitted to the chassis and inside the car.

In light of this state of the art, it is the object of the present invention to create a compact, torque-transmitting, flexible coupling between two shafts which is capable of elastically transmitting high torques and at the same time makes possible good insulation against sound and against oscillations between the two shafts.

Another object of the present invention is to create a ganged joint, in particular a ball-joint using a flexible shaft coupling thereby minimizing the space required in the driveshaft zone especially of front-driven motor vehicles with simultaneous reliable, elastic torque transmission and high acoustic and oscillation insulation.

The flexible shaft-coupling of the invention comprises two coupling components, namely a first coupling component illustratively part of a first shaft or also being a separate part which can be linked to this shaft, and a second coupling component essentially designed in the manner of the first one and which is part of a second shaft or at least can be linked to it. Each of the two coupling components comprises at least two anchoring elements substantially diametrically opposite one another relative to the axis of coupling, i.e., the longitudinal axis of the shafts to be coupled. Obviously precise diametrical arrangement will be possible only for an even number of anchoring elements per coupling component; in the case of odd numbers of anchoring elements per coupling component, they will be correspondingly arranged symmetrically, with identical center angles between the individual anchoring element of each coupling segment.

All anchoring elements of the two coupling components are essentially located in the same radial plane of the coupling in such manner that the elements of the first coupling component and those of the second coupling component will be alternatingly sequential in the circumferential direction. In other words, the anchoring elements of the two coupling elements axially engage each other in the manner of a dog clutch without ever touching in the circumferential direction. The purpose of the anchoring elements is not foremost to directly transmit the torque by direct contact between the two shafts, but it is to act most of all as a support for anchoring pins to receive force-transmitting elastomer straps.

Each anchoring element comprises two anchoring pins essentially pointing radially outward and sequential in the circumferential direction. "Essentially radially outward" does not connote a strictly rigorous radial orientation of the anchoring pins, rather their precise orientation depends essentially on the structure of the radially outward circumferential surfaces of the anchoring elements. Illustratively when there are four anchoring elements, each anchoring element instead of having an arcuate or a circular-cylindrical arcuate outer surface will have two radially outward external surfaces subtending an angle of about 90°, each anchoring pin being mounted on one of the mutually perpendicular outer surfaces. With such a structure the anchoring pin will be arrayed parallel to the radius and be correspondingly offset from it by a given amount. All that matters for the present invention is that the longitudinal axes of all anchoring pins are located in the same plane which is the radial plane of the coupling and that the anchoring pins point away from the central coupling axis.

The anchoring pins receive the elastomer straps or the elastomer ring, each anchoring element being connected in torque-transmitting manner by an elastomer strap or a portion of an elastomer ring to its particular adjoining anchoring element. In other words, the particular adjoining anchoring pin of two adjoining anchoring elements are elastically connected in torque-transmitting manner by an annular or looping elastomer strap. Within the invention, in principle the elastomer straps may be individual ones or designed to be a closed elastomer ring of revolution.

Accordingly, the basic concept of the invention is no longer to mount the two coupling components to be joined so they are axially apart with insertion of the elastomer straps or the elastomer ring, but instead to move the two coupling components assuming the form of the anchoring elements into the same radial plane of the coupling and thereby to lower the required axial space to the absolutely required minimum. The elastomer straps no longer are mounted between the coupling components, rather they are mounted radially outward. The radially outward arrangement of the torque-transmitting members moreover offers the advantage that for radially constant size and compared with the flexible shaft-couplings of the state of the art, higher torques can be transmitted, or for a given torque, a lesser radial size is feasible, on account of the longer lever arm acting relative to the axis of the coupling.

In the simplest case the anchoring elements may be directly integrated into the particular shaft ends or into corresponding shaft flanges. Preferably, however, the anchoring element shall consist of separately pre-fabricated anchoring plates, all being identical to achieve greatest compactness and least material costs. All anchoring plates comprise affixing means whereby the anchoring plates can be affixed essentially rigidly to their particular shaft. Most of all the advantage of this design is that the whole coupling consisting essentially of the anchoring plates and the affixed elastomer straps extending radially outward can be pre-assembled and need only be inserted in final assembly between the shaft ends to be connected to them.

In one embodiment mode the affixing means consists of at least one continuous borehole or threaded borehole parallel to the coupling axis in each anchoring plate to receive a threaded bolt. In other words, this embodiment mode requires only that one threaded bolt be inserted through a corresponding borehole in each anchoring plate and pass into a corresponding threaded borehole in the shaft flange in order to complete the assembly of the pre-assembled shaft-coupling. Similarly, a threaded bolt need only pass through a borehole in the shaft flange and be threaded into the corresponding threaded borehole in the anchoring plate.

As described above, the shaft coupling is primarily suited to transmit torques in torsionally yielding manner and especially in acoustically insulating manner between the two shafts. While basically oscillations and impacts also can be absorbed by the radially outward elastomer shackles enclosing the whole coupling in the direction of coupling, that is, in the axial direction of the shafts to be coupled, the result in operation, however, would be a change in the effective length of these elastomer straps and hence change their torque-transmission characteristics.

Therefore, in a preferred embodiment mode of the invention, the anchoring plates are so designed at their particular mutually facing surfaces or portions thereof and while forming an essentially L-shaped offset that particular anchoring plates which are next to one another in the circumferential direction and belonging to the first and second coupling components rearwardly engage each other at least in segments above the coupling radial plane and behind as regards the direction of the coupling axis while forming an essentially Z-shaped gap. In other words, the two L-shaped edge zones of the mutually facing surfaces of two adjoining edge zones so overlap and engage behind one another that on one hand a gap shall remain essentially in the circumferential direction between the peripherally opposite surfaces of the anchoring plates, where this gap must be so selected as a function of properties of the elastomer straps and as a function of the torque to be transmitted that metal-against-metal contact of the first and second coupling components shall be precluded even under full load. On the other hand a gap remains essentially between the anchoring-plate surfaces facing and overlapping each other in the direction of coupling to prevent metal-against-metal contact of the anchoring plates under normal operating conditions, namely at relatively small oscillations and loads in the direction of coupling, for the purpose of preventing such interfering oscillations from being freely transmitted. On the other hand the overlap assures that peak loads in the direction of coupling shall be absorbed by the direct contact between the two anchoring plates and hence shall be unable to damage or even destroy the elastomer straps.

Preferably the Z-shaped gap extends from the central zone of the shaft coupling as far as into the zone of the anchoring plates, and furthermore, depending on the shape of these anchoring plates, the Z-shape shall flare outward or may remain a constant Z cross-section over the entire radial length.

The Z-shaped overlap of the anchoring plates offers a further advantage, namely that even in the case of rupture of one or more elastomer loops, the coupling shall remain operative, obviously there being then loss of insulation against oscillation.

In order to preserve the elastomer straps also from small loads in the direction of the coupling axis and to always reliably preclude metal-against-metal contact between the anchoring plates and hence between the two coupling components, a preferred embodiment mode of the invention provides an elastomer damper between the surface portions of the particular adjoining anchoring plates which between them subtend the Z-gap and which are opposite in the direction of the coupling axis. This elastomer damper may fill the full central zone of the Z-gap, or it may merely assume the form of a rubber coating on the overlapping surface segments and its sole function is to damp oscillations in the direction of coupling.

A further embodiment mode provides an elastomer element between, or an elastomer coating on the surface segments of the particular adjoining anchoring plates mutually opposite in the radial plane or in the circumferential direction. However, in order to ensure that the torque-transmission characteristics be solely determined by the elasticity of the elastomer straps, this embodiment mode appropriately provides only a thin elastomer coating at the mutually facing surfaces to reliably prevent metal-on-metal contact in the event of a peak load exceeding a given value and on the other hand to improve the emergency operating properties when the shaft coupling has been damaged by the rupture of one or more elastomer straps.

Especially when using a flexible shaft coupling of the invention to transmit torques at high angular speeds, accurate centering of all parts shall be advantageously carried out already during the pre-assembly of the shaft coupling. In a preferred embodiment mode, the anchoring plates therefore are mounted in such manner that a clearance which is continuous in the direction of coupling shall be formed in the radially inner zone in relation to the coupling axis to receive a centering and/or support ring of which the shape is substantially complimentary to inside contour of said clearance. Both the clearance and the centering and/or support ring preferably shall be rotationally symmetrical, in particular circular or annular or disk-shaped especially with respect to operation at high angular speeds. Once the centering and/or support ring or the support disk has been inserted, the particular radially inner circumferential area of the anchoring plates can be made to rest at least in some parts against the outer circumferential zone of said centering and/or support ring or support disk. This centering and/or support ring offers the further advantage that when being slightly radially larger than the clearance, the elastomer straps can be prestressed in precisely defined manner. Lastly the centering and/or support ring serves to absorb undesired rotation of one or more anchoring plates caused by the eccentric loads applied by the elastomer straps to the anchoring plates due to the fastening of the anchoring plates to the particular shaft should an affixing screw come loose after long operation or because of improper assembly.

In order to make possible axial fastening of the anchoring plates besides radial centering, a preferred embodiment mode of the invention comprises a centering and/or support ring at the surface of which runs a circumferential, annularly closed or interrupted projection of which the cross-section is bulging, in particular being toroidal, rectangular, semicircular or triangular, said projection being able to engage a clearance complimentary to it in shape and function and located in the particular inside wall of the anchoring plates forming the continuous clearance.

In particular when the centering is used strictly for pre-assembly centering purposes, whereby the forces acting on the ring will be comparatively slight, it will suffice to make this ring of plastic. As a rule the plastic of the centering ring or disk will be adequate to prevent formation of an undesired integral sound bridge between the anchoring plates of the two coupling components. If, however, the ring must be foremost a support member, entailing comparatively high forces to be absorbed, it shall be made of suitable metal to be strong enough.

In order to reliably prevent the formation of an integral sound bridge especially when using such a metal centering and/or support ring, where said acoustic bridge would be formed by metal-to-metal contact between the two coupling components through this ring, a further embodiment mode makes use of a centering and/or support ring composed of two separate, axially sequential centering rings out of direct contact. "Out of direct contact" means in particular that an acoustically insulating plastic or elastomer element for instance in the form of a disk is inserted between the two centering rings and reliably precludes the two ring components from touching each other. The first of the two centering rings will exclusively cooperate in centering and/or supporting manner with the associated inner surfaces of the anchoring plates of the first coupling component and the second centering ring will exclusively cooperate with the associated inner surfaces of the second coupling component. This is achieved in the simplest way in that the inner surface segments of the anchoring plates forming the continuous clearance are offset in the direction of coupling, illustratively the anchoring plates of the first coupling component having an effective inside diameter at least slightly larger in the direction of the first shaft than in the direction of the second shaft. The reverse design applies for the anchoring plates of the second coupling component.

In other words the above signifies that when using two centering disks of the same outside diameter essentially corresponding to the smaller inside diameter of the clearance, the anchoring plates of the second coupling component will solely rest against that centering ring which is nearer the first shaft. All anchoring plates of one anchoring part therefore rest exclusively against their associated centering ring, whereas a radial space will be present between them and the other centering ring. As a result reliable insulation is assured with respect to oscillations and in particular with respect to acoustics.

Especially when high and highest torques must be transmitted, the invention in another embodiment mode provides that looping reinforcement insets are imbedded in the elastomer of the elastomer strap or of the elastomer ring, in particular by vulcanization, said insets enclosing the mutually facing anchoring pins of two adjoining anchoring plates. Preferably these reinforcement insets shall consist of high-strength fiber materials. The loop-shape is arbitrary and merely depends on the desired torsional characteristics of the elastomer coupling. Preferably, however, the loops shall be assuming the eight-form or be flat and like a stadium O, the loop legs running between the anchoring balls being parallel or being ovally expanded by an expansion spring.

Care must be paid when selecting the loop and elastomer material that it be matched to the expected torques and the desired torsional compliance or the admissible angle of torsion in order that for a given essentially circumferential spacing between the adjoining anchoring plates of the two coupling components a metal-to-metal contact be averted under all circumstances and thereby also a direct, rigid driving effect.

Basically the flexible shaft coupling of the invention is applicable to all torques which must be transmitted elastically. However, in the light of the minimal allowed space, this flexible shaft coupling is advantageously applicable to motor vehicle wheel driveshafts. Preferably the flexible shaft coupling of the invention used therein is the commonplace ganged joint, in particular the drive-side ganged joint.

Accordingly, the invention also provides a ganged joint, in particular a ball ganged slip-joint with a shaft stub both at the input and at the output side, the two shaft stubs being coupled to be torque-transmitting by the joint while allowing a defined angle of misalignment and axial displacement and while using a flexible shaft coupling. The ganged joint known per se ends in known manner on the drive, i.e. the power side in a housing flange which is rigidly joined on one hand to the outer joint ring and on the other hand to the driveshaft, i.e. to the transmission stub. In the invention, the known ganged joint can be utilized essentially unmodified, merely the first housing flange requiring alteration.

Accordingly the ganged joint of the invention is characterized by a first housing flange coupled essentially rigidly on the drive side with the joint outer ring and covering the joint while having means to rigidly affix the anchoring elements, i.e. plates of the first coupling component on its side away from the joint, further by a second housing flange overlapping at least in part the first housing flange while forming an inner space and having means at its inner side facing the first housing flange to rigidly affix the anchoring elements, i.e. plates of the second coupling component and further a driveshaft-stub at its outer side or a connection for a driveshaft. In other words, the flexible coupling connecting in torsionally elastic manner the two housing flanges and thereby the drive and output shafts is mounted in a separate housing which is mounted behind or after the ganged joint proper.

BRIEF DESCRIPTION OF THE DRAWINGS

The invention is elucidated below in relation to simple embodiment modes shown in the drawings.

DETAILED DESCRIPTION OF THE PREFERRED EMBODIMENTS

Figure 1:
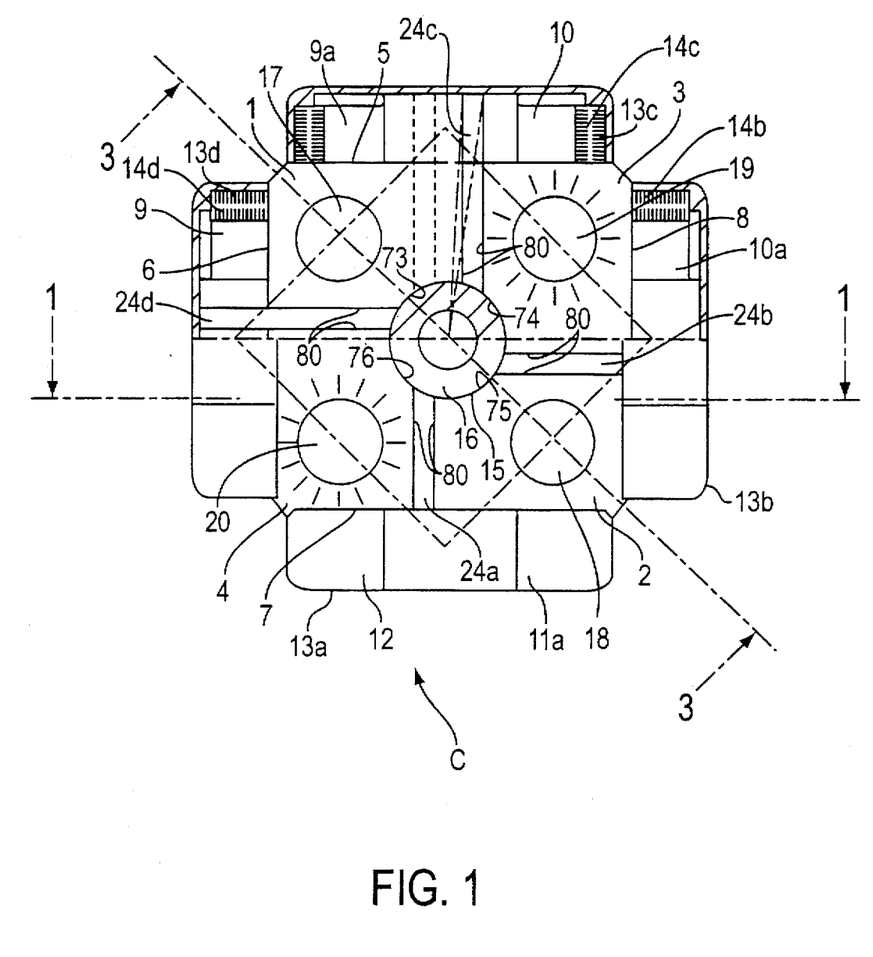
FIG. 1 is a partial cutaway schematic sideview of a first embodiment of a flexible shaft coupling of the invention with four anchoring plates and four elastic straps.

FIG. 1 shows a first embodiment of an elastic flexible shaft coupling C according to the present invention. This shaft coupling C comprises four anchoring plates 1,2 and 3,4. The diametrically opposite anchoring plates 1 and 2 form a first coupling component. The diametrically opposite anchoring plates 3 and 4 form a second coupling component. All anchoring plates 1,2 and 3,4 are wholly independent units and are essentially identical.

Figure 2:
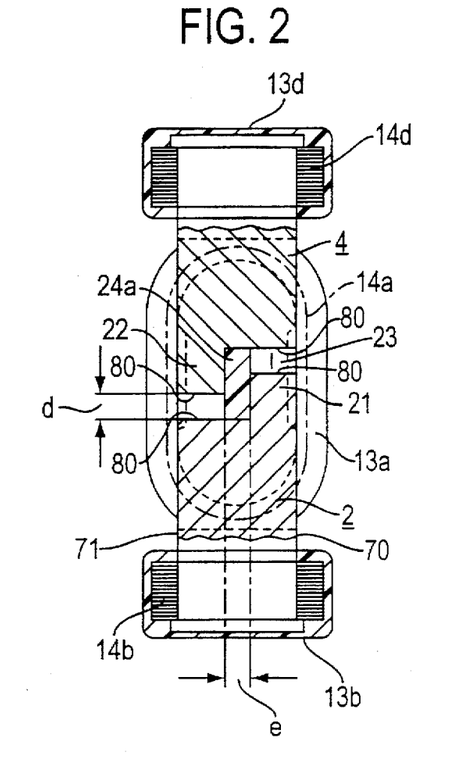
FIG. 2 is a schematic longitudinal section relative to the coupling axis taken along line 1—1 of the embodiment of FIG. 1 where the strap is of an elongated oval shape.

Essentially the anchoring plates 1,2 and 3,4 have the shapes of parallelepipeds and together define four radially outward circumferential surfaces 5,6 and 7,8, and two outer mounting surfaces 70,71 depicted in FIG. 2. Each anchoring plate 1,2 and 3,4 comprises at its respective radially outward circumferential surface a pair of an anchoring pins 9,9a; 10,10a; 11,11a; and 12,12a for a total of eight pins. Each anchoring pin 9,9a; 10,10a; 11,11a; and 12,12a points radially outward with each pair extending at right angles relative to the other. In the assembled condition depicted in FIG. 1, adjacent pin sets 9a and 10, 10a and 11; 11a and 12; and 12a and 9 are parallel to each other and are adjacent to each other. Each anchoring plate 1,2 and 3,4 bears two peripherally sequential anchoring pins.

Figure 1A:
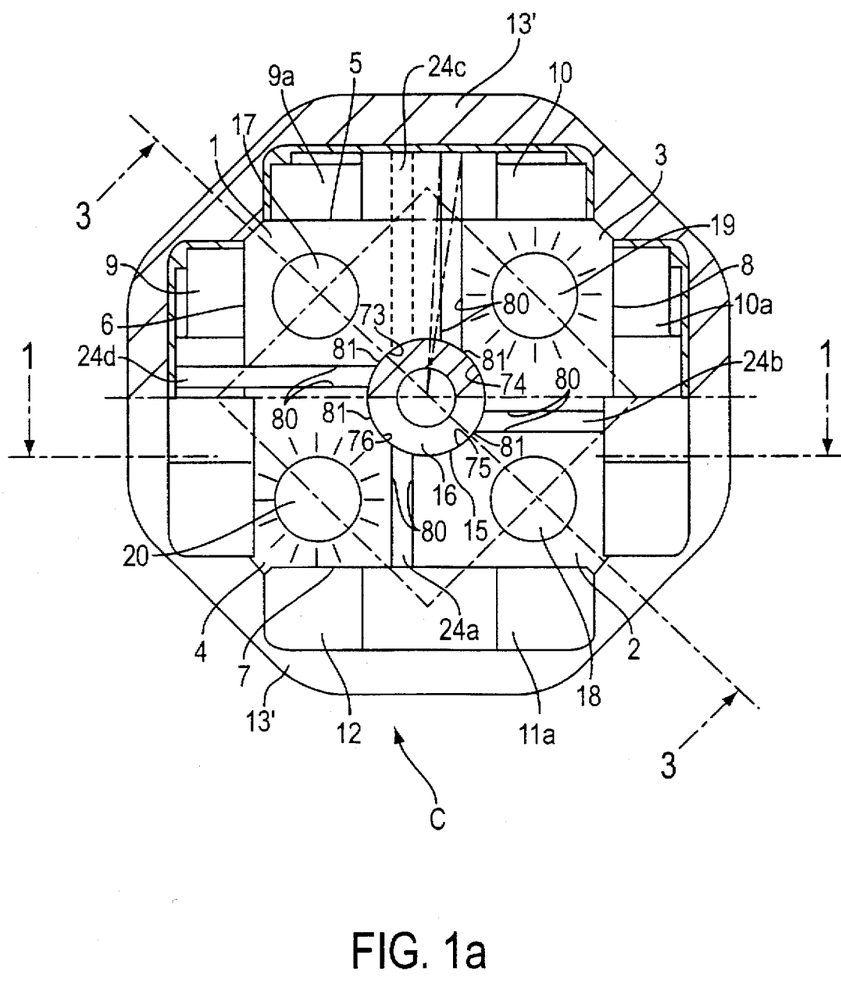
FIG. 1a is a partial cutaway schematic side view of a second embodiment of a flexible shaft of the invention with four anchoring plates and a closed elastomer ring.

Because each adjacent pin set is identical, only set "9a, 10" will be discussed in detail herein. Adjoining pins 9a and 10 of the adjoining anchoring plates 1,3 are connected in torque-transmitting manner by an injection-molded and vulcanized elastomer strap 13c. Four such straps 13a, 13b, 13c, 13d are used, one for each set of pins. Alternatively, instead of using four straps 13a, 13b, 13c, 13d, a closed elastomer ring 13' may be used as depicted in FIG. 1a. The torque to be transmitted acts about the coupling axis passing in FIG. 1 through the center of the shaft coupling C and perpendicularly to the plane of the drawing. The elastomer straps 13a, 13b, 13c, 13d are reinforced by high strength filament loops 14a, 14b, 14c, 14d connecting the respective adjoining set of adjacent anchoring pins.

A continuous central clearance 15 is defined by inner arcuate surfaces 73, 74, 75, 76 of the anchoring plates 1,2 and 3,4 and receives as annular centering ring 16 having its outward circumferential surface in contact with inner arcuate surfaces 73, 74, 75, 76. An elastomeric coating 81 is applied to surfaces 73, 74, 75, 76.

The anchoring plates 1,2 and 3,4 have surfaces 70, 71 (FIG. 2) with affixing means in the form of continuous boreholes 17, 18 and threaded boreholes 19, 20, respectively, which extend through the respective plates in a longitudinal direction. The anchoring plates 1,2 of the first coupling component are rigidly affixed by passing threaded bolts engaging corresponding threaded boreholes (not shown) of the first shaft. The two anchoring plates 3,4 are screwed together in a similar manner with an affixing flange of the second shaft (not shown).

As shown in FIG. 2, each of the anchoring plates 1,2 and 3,4 has an L-shaped offset projection. As shown in FIG. 2, anchoring plate 2 has an L-shaped projection 21 and anchoring plate 4 has an L-shaped projection 22. The mutual arrangement of the anchoring plates is described herein only with reference to the anchoring plates 2 and 4, the relative arrangements and the designs of the anchoring plates being identical for the other three pairings of anchoring plates. The anchoring plates 2 and 4 are mounted in such manner relative to one another that the L-shaped projections of the mutually facing circumferential segments overlap each other in the longitudinal direction and in a circumferential direction. A Z-shaped gap 23 is formed by the L-shaped projection 21 of the anchoring plate 2 and by the L-shaped projection 22 of the anchoring plate 4. Because of this gap, the anchoring plates 2 and 4 therefore are opposite one another as seen in the circumferential direction and apart by a distance d and, in the direction of coupling, by a distance e without touching one another at all.

The size of the spacing d must be selected in such manner as a function of the torsional resistance of the elastomer straps 13a, 13b, 13c, 13d and of the torque to be transmitted that even when under peak load, there shall be no direct and especially no metal-to-metal contact on account of the relative motions of the two coupling components and thereby of the anchoring plates 2 and 4, respectively, of the circumferential surface segments of the anchoring plates 2 and 4 that face each other.

Figure 2A:
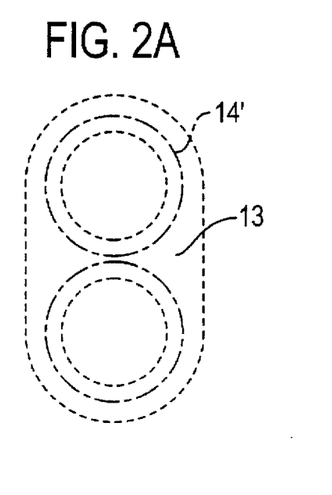
FIG. 2a is a schematic longitudinal side view of an alternative embodiment of the invention.

An elastomer damper element 24a is located in spacing e. Four such spacing e extend from central clearance 15 to a respective circumferential surface 5, 6, 7, 8 and have elements 24a, 24b, 24c, 24d, respectively, located therein. Alternatively, the facing surfaces can be coated with an elastomer coating. The anchoring plates 2 and 4 of the first and second coupling components are in indirect contact through the inserted elastomer damper 24a, however the material properties of the elastomer reliably insulate against middle and low frequency oscillations in the direction of coupling especially in the acoustic range. Accordingly, the elastomer damper 24a, 24b, 24c, 24d on one hand makes possible a substantially accurate axial mutual position of the anchoring plates and on the other hand the elastomer struts 13a, 13b, 13c, 13d are relieved from all forces and oscillations acting in the direction of coupling. Additionally, an elastomer coating 80 may advantageously be provided on the surface segments, as shown in FIG. 2. Referring to FIGS. 2 and 2A, alternative embodiments of loop 14 are shown. In FIG. 2, loop 14 encircles both anchoring pins and is of an elongated oval shape. In the alternative embodiment of FIG. 2A, loop 14' is disposed like a figure eight about an elastomeric strap 13.

Figure 3:
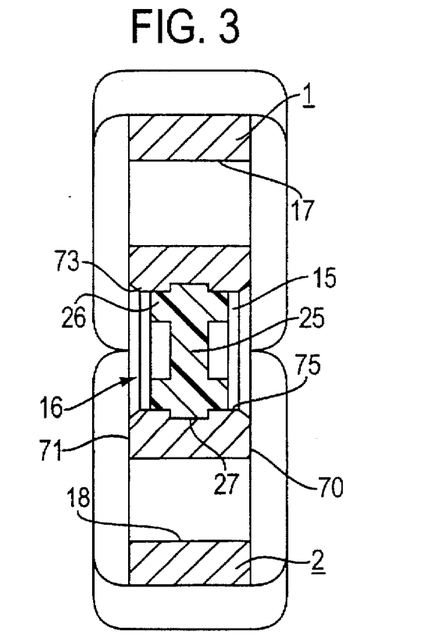
FIG. 3 is a schematic longitudinal section relative to the coupling axis of the embodiment of FIG. 1 taken along line 3—3.

The centering and support ring 16 mounted in the clearance 15 is shown in closer detail in FIG. 3. The centering ring 16 consists of a disk-shaped base unit 25 and an annular rest portion 26 against the radially outward circumferential of which the radially inner circumferential surfaces 73, 74, 75, 76 are in contact. By means of this design already definite centering will be assured. In order to secure on one hand the centering ring 16 against dropping out and on the other hand also to assure or improve axial centering of the anchoring plates relative to each other, the centering ring comprises a cross-sectionally flat, rectangular, closed circumferential projections 27 on its radially outer circumferential surface, the projection 27 entering a corresponding recess in the radially inner surfaces 73, 74, 75, 76 of the anchoring plates 1,2 and 3,4. The centering ring providing indirect contact between the anchoring plates 1 and 2, of the first coupling component and the anchoring plates 3 and 4 of the second coupling component, in this embodiment mode this centering ring is made of plastic, especially one suitable for oscillation damping, in particular for acoustic damping.

Figure 4:
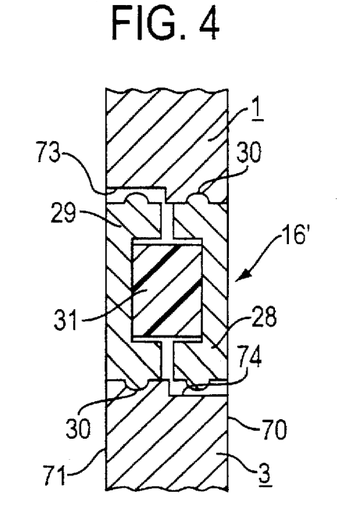
FIG. 4 is a partial cross section depicting a divided centering and/or support ring of the invention.

FIG. 4 shows another embodiment mode of a centering and support ring. The centering ring 16' in this embodiment mode is made into two axially spaced centering rings 28 and 29. These two centering rings have substantially the same outside diameters and on their radially outward circumferential surfaces have annular and circumferential locking bulges 30 in the manner already described above. A plastic pad 31, illustratively an elastomer, is so placed between the two centering rings 28 and 29 that they do not touch and that to this extent they are insulated from oscillations, especially acoustically.

Contrary to the case shown in FIG. 3, the inner circumferential surfaces of the anchoring plates 1,2 and 3,4 forming the recess 15 no longer has the same effective diameter in the direction of coupling; instead they are repeatedly offset centrally in the direction of coupling. This offsetting is such that the offset of the anchoring plates 1 and 2 of the first coupling component has a larger inside diameter on the left side of FIG. 4 pointing to the first shaft, whereas the offset of the anchoring plates 3 and 4 on the right side of FIG. 4 pointing to the second shaft has the larger inside diameter. The particular lesser inside diameter of the offset essentially corresponds to the outside diameter of the centering rings. In other words, the anchoring plates 1 and 2 of the first coupling component solely rest on the centering ring 28, and the anchoring plates 3 and 4 of the second coupling component solely rest on the centering ring 29. Obviously the diameter of the larger offset must be selected in such a way that contact with the particular centering ring shall always be precluded.

Figures 5, 6:
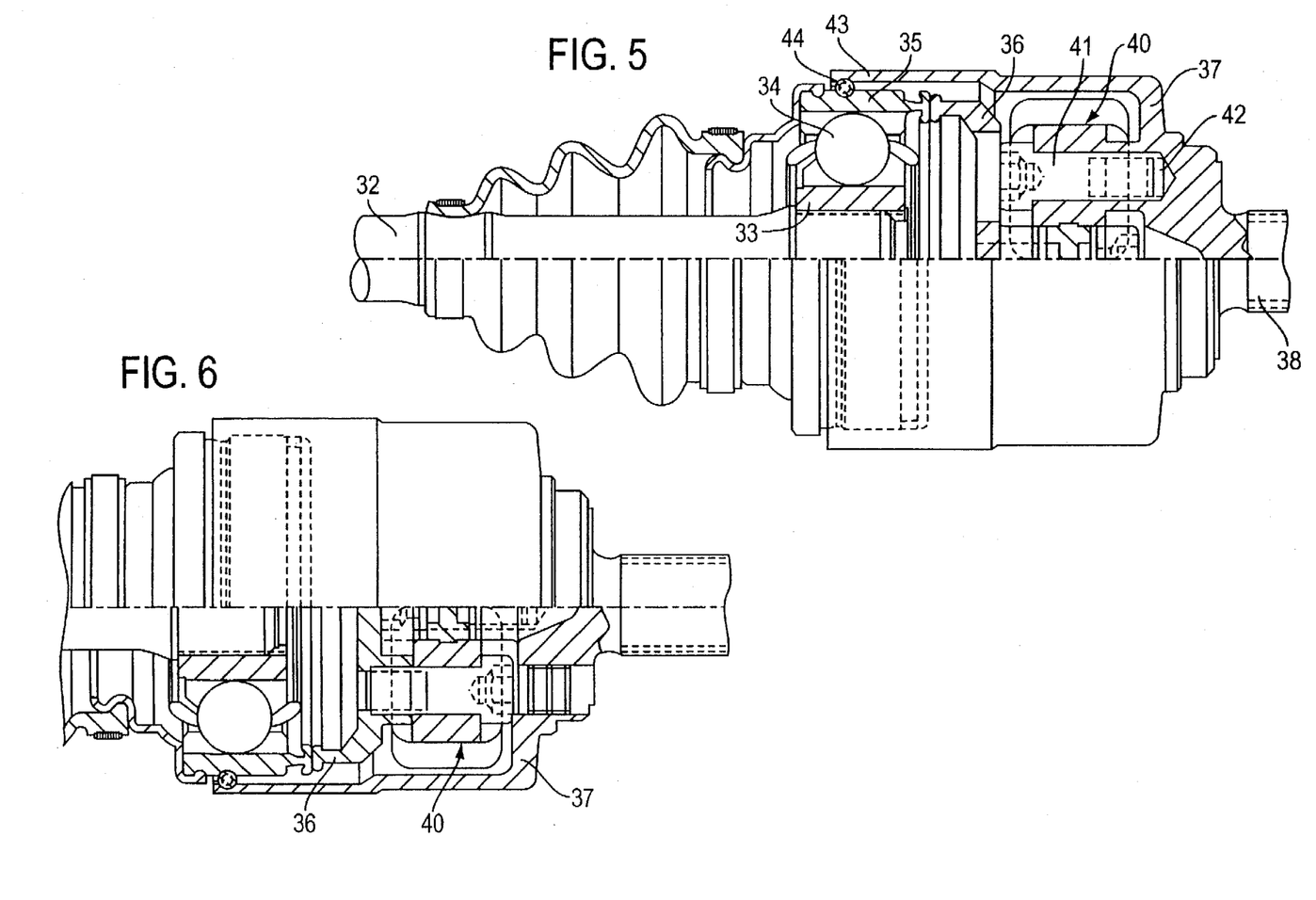
FIG. 5 is a ganged joint using a flexible coupling shaft of the invention shown partly in cutaway form.
FIG. 6 is a partial cutaway sideview of the ganged joint of FIG. 5 rotated by 90° about the coupling axis.

FIG. 5 shows a ball ganged slip-joint using a flexible shaft coupling such as described above. The ganged joint comprises an output shaft 32 connected in substantially rigid and in torque-transmitting manner by the joint inside ring 33 and the joint-balls 34 to the outside ring 35. However, in the light of the known ball-joint design, the power shaft 32 might pivot relative to the outer joint ring 35. Moreover, the known design allows shifting the power shaft 32 inside the joint. A first outer flange 36 is rigidly affixed, in this case by friction-welding, to the joint outer ring 35. On one hand this outer flange serves to reliably cover the actual ball joint and on the other hand to assemble the first coupling segment of the flexible coupling shaft.

A second housing flange 37 is mounted to overlap the first housing flange 36 and the joint itself in such manner that a cavity is formed between the first housing flange 36 and the inner wall of the second housing flange 37 to receive a flexible coupling shaft as described above. The second housing flange 37 comprises a shaft stub 38 to connect to a driveshaft or to a power output.

Further means to affix the anchoring plates of the second coupling component are present at the axially inner zone of the second housing flange 37.

The flexible shaft coupling of the invention is denoted overall by 40 in FIG. 5. The flexible shaft coupling 40 is affixed to the second housing flange 37 by means of schematically indicated threaded bolts 421 passing through the particular anchoring plates and entering threaded boreholes 42 of the housing flange 37.

FIG. 6 shows the mounting of the anchoring plates of the first coupling component to the first housing flange 36. In this case the screw-fastening is similar as described above, namely using threaded bolts passing through the anchoring plates and entering threaded boreholes in the housing flange 36.

Although in this ganging joint all misalignments and displacements are designed to be absorbed by the ball-joint itself, slight misalignments and displacements in the flexible shaft coupling cannot be reliably excluded on account of the elasticity of the inserted elastomer shackles and the inserted elastomer damper. To absorb such undesired motions, the second housing flange 37 rests by its axially inner zone 43 (FIG. 5) and by means of a sealing and support ring 44 on the joint outer ring 35. Furthermore the ring 44 serves to reliably seal the cavity formed between the two housing flanges and conventionally filled with oil or grease.

We claim:

1. A flexible shaft-coupling, comprising:
    a first coupling component including a first anchoring element and a second anchoring element arranged mutually diametrically opposite each other with respect to a coupling axis of the shaft-coupling;
    a second coupling component including a third anchoring element and a fourth anchoring element arranged mutually diametrically opposite each other with respect to the coupling axis;
    said anchoring elements each being positioned in a radial plane of the coupling perpendicular to the coupling axis such that said first anchoring element and said second anchoring element are each adjacent said third and fourth anchoring elements;
    a first strap, a second strap, a third strap and a fourth strap, said first strap connecting said first and third anchoring elements, said second strap connecting said third and second anchoring elements, said third strap connecting said second and fourth anchoring elements and said fourth strap connecting said first and fourth anchoring elements; and
    a first elastomeric damper being positioned between said first and second coupling components.

2. The flexible shaft coupling of claim 1, wherein each of said anchoring elements includes two anchoring pins.

3. The flexible shaft coupling of claim 2, wherein said two anchoring pins of each anchoring element extend radially outwardly at a 90° angle relative to each other.

4. The flexible shaft coupling of claim 1, wherein said first anchoring element has a first pin and a second pin, said second anchoring element has a first pin and a second pin, said third anchoring element has a first pin and a second pin and said fourth anchoring element has a first pin and a second pin and wherein:
    said first pin of said first anchoring element is parallel to said second pin of said fourth anchoring element;
    said second pin of said first anchoring element is parallel to said first pin of said third anchoring element;
    said second pin of said third anchoring element is parallel to said first pin of said second anchoring element; and
    said second pin of said second anchoring element is parallel to said first pin of said fourth anchoring element.

5. The flexible shaft coupling of claim 1, wherein said first and second anchoring elements have boreholes which extend therethrough in a longitudinal direction of the element.

6. The flexible shaft coupling of claim 1, wherein said third and fourth anchoring elements have threaded boreholes which extend therethrough in a longitudinal direction of the element.

7. The flexible shaft coupling of claim 1, wherein adjacent anchoring elements each have L-shaped projections which overlap each other in a radial direction and are spaced from each other in a longitudinal direction forming a first gap therebetween and wherein said L-shaped projections are radially spaced from a corresponding circumferential surface segment on the adjacent anchoring element.

8. The flexible shaft coupling of claim 7, further comprising an elastomeric coating on each of the circumferential surface segments of the first, second, third and fourth anchoring elements.

9. The flexible shaft coupling of claim 7, wherein the first elastomeric damper is positioned in said first gap.

10. The flexible shaft coupling of claim 1, wherein said anchoring elements each have an arcuate inner surface together defining a central clearance for receiving a centering ring of a complementary shape.

11. The flexible shaft coupling of claim 10, wherein said centering ring is made of plastic.

12. The flexible shaft coupling of claim 1, wherein said first, second, third and fourth straps each include reinforcing insets embedded therein.

13. A flexible shaft-coupling, comprising:
   a first coupling component including a first anchoring element and a second anchoring element arranged mutually diametrically opposite each other with respect to a coupling axis of the shaft-coupling;
   a second coupling component including a third anchoring element and a fourth anchoring element arranged mutually diametrically opposite each other with respect to the coupling axis;
   said anchoring elements each being positioned in a radial plane of the coupling perpendicular to the coupling axis such that said first anchoring element and said second anchoring element are each adjacent said third and fourth anchoring elements;
   a first elastomeric damper is positioned between said first and second coupling components; and
   a closed elastomer ring connecting said first and second coupling components.

14. The flexible shaft coupling of claim 13, wherein each of said anchoring elements includes two anchoring pins.

15. The flexible shaft coupling of claim 14, wherein said two anchoring pins of each anchoring element extend radially outwardly at a 90° angle relative to each other.

16. The flexible shaft coupling of claim 13, wherein said first anchoring element has a first pin and a second pin, said second anchoring element has a first pin and a second pin, said third anchoring element has a first pin and a second pin and said fourth anchoring element has a first pin and a second pin and wherein:
   said first pin of said first anchoring element is parallel to said second pin of said fourth anchoring element;
   said second pin of said first anchoring element is parallel to said first pin of said third anchoring element;
   said second pin of said third anchoring element is parallel to said first pin of said second anchoring element; and
   said second pin of said second anchoring element is parallel to said first pin of said fourth anchoring element.

17. The flexible shaft coupling of claim 13, wherein said first and second anchoring elements have boreholes which extend therethrough in a longitudinal direction.

18. The flexible shaft coupling of claim 13, wherein said third and fourth anchoring elements have threaded boreholes which extend therethrough in a longitudinal direction of the element.

19. The flexible shaft coupling of claim 14, wherein adjacent anchoring elements each have L-shaped projections which overlap each other in a radial direction and are spaced from each other in a longitudinal direction forming a first gap therebetween and wherein said L-shaped projections are radially spaced from a corresponding circumferential surface segment on the adjacent anchoring element.

20. The flexible shaft coupling of claim 19, further comprising an elastomeric coating on each of the circumferential surface segments of the first, second, third and fourth anchoring elements.

21. The flexible shaft coupling of claim 19, wherein the first elastomeric damper is positioned in said first gap.

22. The flexible shaft coupling of claim 13, wherein said anchoring elements each have an arcuate inner surface together defining a central clearance for receiving a centering ring of a complementary shape.

23. The flexible shaft coupling of claim 22, wherein said centering ring is made of plastic.

24. A ganged joint having an input side and an output-side shaft stub which are connected in torque transmitting manner by a flexible shaft coupling, said flexible shaft coupling comprising:
   a first coupling component including a first anchoring element and a second anchoring element arranged mutually diametrically opposite each other with respect to a coupling axis of the shaft-coupling;
   a second coupling component including a third anchoring element and a fourth anchoring element arranged mutually diametrically opposite each other with respect to the coupling axis;
   said anchoring elements each being positioned in a radial plane of the coupling perpendicular to the coupling axis such that said first anchoring element and said second anchoring element each adjacent said third and fourth anchoring elements;
   a first strap, a second strap, a third strap and a fourth strap, said first strap connecting said first and third anchoring elements, said second strap connecting said third and second anchoring elements, said third strap connecting said second and fourth anchoring elements and said fourth strap connecting said first and fourth anchoring elements; and
   a first elastomeric damper being positioned between said first and second coupling components.

25. A ganged joint having an input side and an output-side shaft stub which are connected in torque transmitting manner by a flexible shaft coupling, said flexible shaft coupling comprising:
   a first coupling component including a first anchoring element and a second anchoring element arranged mutually diametrically opposite each other with respect to a coupling axis of the ganged joint;
   second coupling component including a third anchoring element and a fourth anchoring element arranged mutually diametrically opposite each other with respect to the coupling axis;
   said anchoring elements each being positioned in a radial plane of the coupling perpendicular to the coupling axis such that said first anchoring element and said second anchoring element are each adjacent said third and fourth anchoring elements;
   a first elastomeric damper is positioned between said first and second coupling components; and
   a closed elastomer ring connecting said first and second coupling components.

* * * * *